United States Patent
Posamentier

(10) Patent No.: US 7,388,503 B2
(45) Date of Patent: Jun. 17, 2008

(54) SHIELDED RFID TAGS IN LABELS

(75) Inventor: Joshua Posamentier, Oakland, CA (US)

(73) Assignee: Intel Corporation, Santa Clara, CA (US)

( * ) Notice: Subject to any disclaimer, the term of this patent is extended or adjusted under 35 U.S.C. 154(b) by 219 days.

(21) Appl. No.: 11/089,917

(22) Filed: Mar. 24, 2005

(65) Prior Publication Data

US 2006/0214802 A1    Sep. 28, 2006

(51) Int. Cl.
*G08B 13/14* (2006.01)

(52) U.S. Cl. .............................. 340/572.8; 340/572.1; 340/10.1

(58) Field of Classification Search ............. 340/572.8, 340/572.1, 10.1; 283/109; 235/375; 156/60; 174/353, 372; 150/147, 148

See application file for complete search history.

(56) References Cited

U.S. PATENT DOCUMENTS

| | | | | |
|---|---|---|---|---|
| 4,717,438 A * | 1/1988 | Benge et al. | ............... | 156/152 |
| 6,121,544 A * | 9/2000 | Petsinger | .................... | 174/353 |
| 6,181,247 B1* | 1/2001 | Bremer et al. | ........... | 340/572.1 |
| 6,229,444 B1* | 5/2001 | Endo et al. | ............. | 340/572.6 |
| 6,320,509 B1* | 11/2001 | Brady et al. | ............ | 340/572.7 |
| 6,356,201 B1* | 3/2002 | Alles | .......................... | 340/679 |
| 6,404,341 B1* | 6/2002 | Reid | ....................... | 340/572.8 |
| 6,486,780 B1* | 11/2002 | Garber et al. | ........... | 340/572.1 |
| 2006/0145860 A1* | 7/2006 | Brown et al. | ............ | 340/572.7 |

\* cited by examiner

*Primary Examiner*—Anh V. La
(74) *Attorney, Agent, or Firm*—John F. Travis

(57) ABSTRACT

Labels that have radio frequency identification (RFID) tags embedded within them may include a removable electromagnetic shield that is removed only for the next tag to be processed, so that only that tag will be detected by an RFID reader. In some embodiments such processing includes printing the labels. Different embodiments may use single-sided or double-sided shielding.

19 Claims, 5 Drawing Sheets

SHIELDED RFID TAGS IN LABELS

BACKGROUND

Advances in radio frequency identification (RFID) technology have made it possible to embed RFID tags into printable labels. A label may be printed with appropriate information, and then the label attached to an associated device. The identification number of the RFID tag in that label may then be associated with the labeled device. For this process to be efficiently automated, rolls of such labels (or sheets, or other multiple-label configurations) may be provided to the printer. An RFID reader may read the identification number of the next label being printed, and a computer record may be generated to associate that particular identification number with the item to which that label is to be attached. However, having many RFID tags in close proximity, which would be the case in, for instance, a roll of labels, may confuse the RFID reader, which won't know which of the many RFID tags numbers is embedded in the next label to be printed.

Unused rolls (or sheets, etc.) of such labels might also be left within range of the RFID readers stationed at dock doors, warehouses, etc. These labels might then interfere with the ability of those readers to identify the RFID-associated goods that are also at the facility by increasing the number of tags that need to be singulated and slowing down the entire process.

BRIEF DESCRIPTION OF THE DRAWINGS

The invention may be understood by referring to the following description and accompanying drawings that are used to illustrate embodiments of the invention. In the drawings.

DETAILED DESCRIPTION

Figure 1:
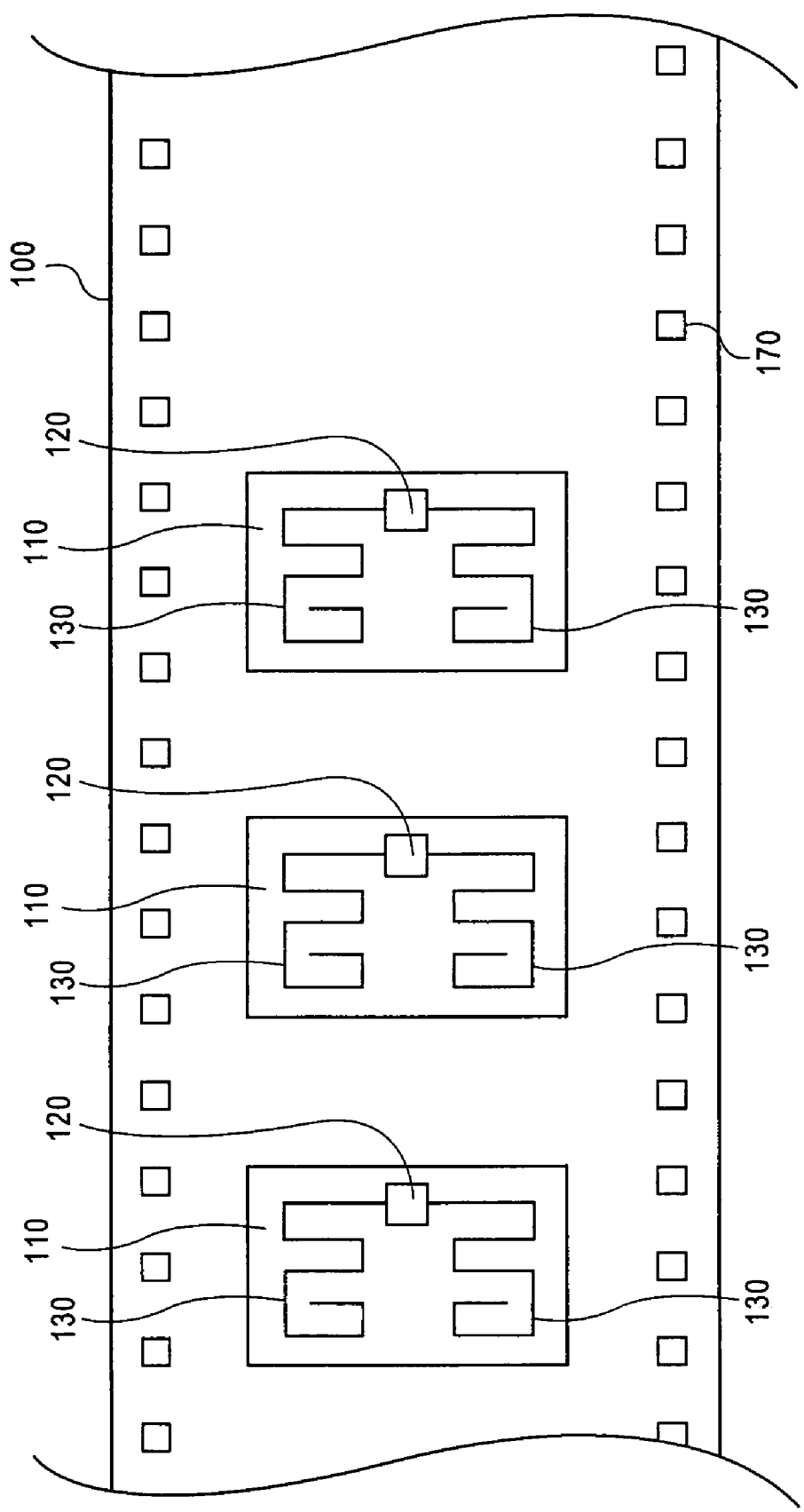
FIG. 1 shows a top view of a portion of a strip of labels with an RFID tag in each label, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, the different embodiments described my have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements co-operate or interact with each other, but they may or may not be in direct physical or electrical contact.

The term "processor" may refer to any device or portion of a device that processes electronic data from registers and/or memory to transform that electronic data into other electronic data that may be stored in registers and/or memory. A "computing platform" may comprise one or more processors.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Various embodiments of the invention may be implemented in one or a combination of hardware, firmware, and software. The invention may also be implemented as instructions stored on a machine-readable medium, which may be read and executed by a computing platform to perform the operations described herein. A machine-readable medium may include any mechanism for storing, transmitting, or receiving information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces and/or antennas that transmit and/or receive those signals, etc.), and others.

Some embodiments of the invention may provide electromagnetic shielding with the labels, so that a nearby RFID reader may not be able to energize the tags, or alternately may not be able to read the data in the tags if the tags are energized. When a label is to be printed, or otherwise handled, the shielding for that label may be fully or partially removed, so that the RFID reader will be able to read the RFID tag in that label only, while the RFID tags in the following labels will still be undetectable by the RFID reader. Some embodiments may use shielding on both the top and bottom of the label, while other embodiments may use shielding on only one side of the label. In some embodiments the shielding may be part of the label's backing material.

FIG. 1 shows a top view of a portion of a strip of labels with an RFID tag in each label, according to an embodiment of the invention. An RFID tag may be defined as comprising an RFID antenna (to receive an incoming signal that serves to query the RFID tag and to transmit a response in the form of a modulated radio frequency signal), and an RFID tag circuit (which may include circuitry to store an identification code for the RFID tag, circuitry to transmit that code through the antenna, and in some embodiments a power circuit to collect received energy from the incoming radio frequency signal and provide that energy to power the operations of the RFID tag circuit). The embodiment of FIG. 1 shows a supporting layer 100 of material to hold the labels in place for printing, a series of labels 110 removably attached to the supporting layer, an RFID tag circuit 120 on or in each label, and antenna elements 130 connected to each RFID tag circuit that are on or in each label. The illustrated embodiment also shows multiple sprocket holes 170 in the supporting layer 100 to permit the labels to be accurately guided through a printer, but other embodiments may use other techniques to accurately control the labels. In some embodiments supporting layer 100 may have a generally planar shape, such as a thin flexible layer.

In some embodiments the labels may be attached to the supporting layer 100 with an adhesive that is weak enough to allow the labels to be removed after printing, though other embodiments may use other techniques. In some embodiments (not shown), the labels may be connected directly together (e.g., with perforations in the label material forming tearable separation lines between adjacent labels), without a separate supporting layer 100, if the labels themselves provide sufficient strength to form a strip. Still other embodiments may provide sheets with multiple labels on each sheet, rather than the continuous strip configuration shown in FIG. 1. Regardless of the configuration of the labels and any supporting layer 100 that might be used to hold them in place, various embodiments of the invention may also contain removable electromagnetic shielding that covers at least the antenna of each RFID tag. Such shielding is not shown in FIG. 1 to avoid obscuring other details of FIG. 1, but is shown in later figures and described in the associated text for those later figures.

The labels 110 may be made of any feasible material that is suitable for labels, such as but not limited to paper or plastic. The RFID tag circuits 120 and antenna elements 130 may be affixed to the labels 110 through any feasible technique. Such techniques may include one or more of, but may not be limited to, the following: 1) attaching pre-manufactured circuits and/or antenna elements to the labels, 2) creating the circuits and/or antenna elements directly on the labels, in some embodiments through a printing process using conductive and/or semi-conductive inks, 3) sandwiching the circuits and/or antennas between two layers of label material, 4) etc.

Figure 2:
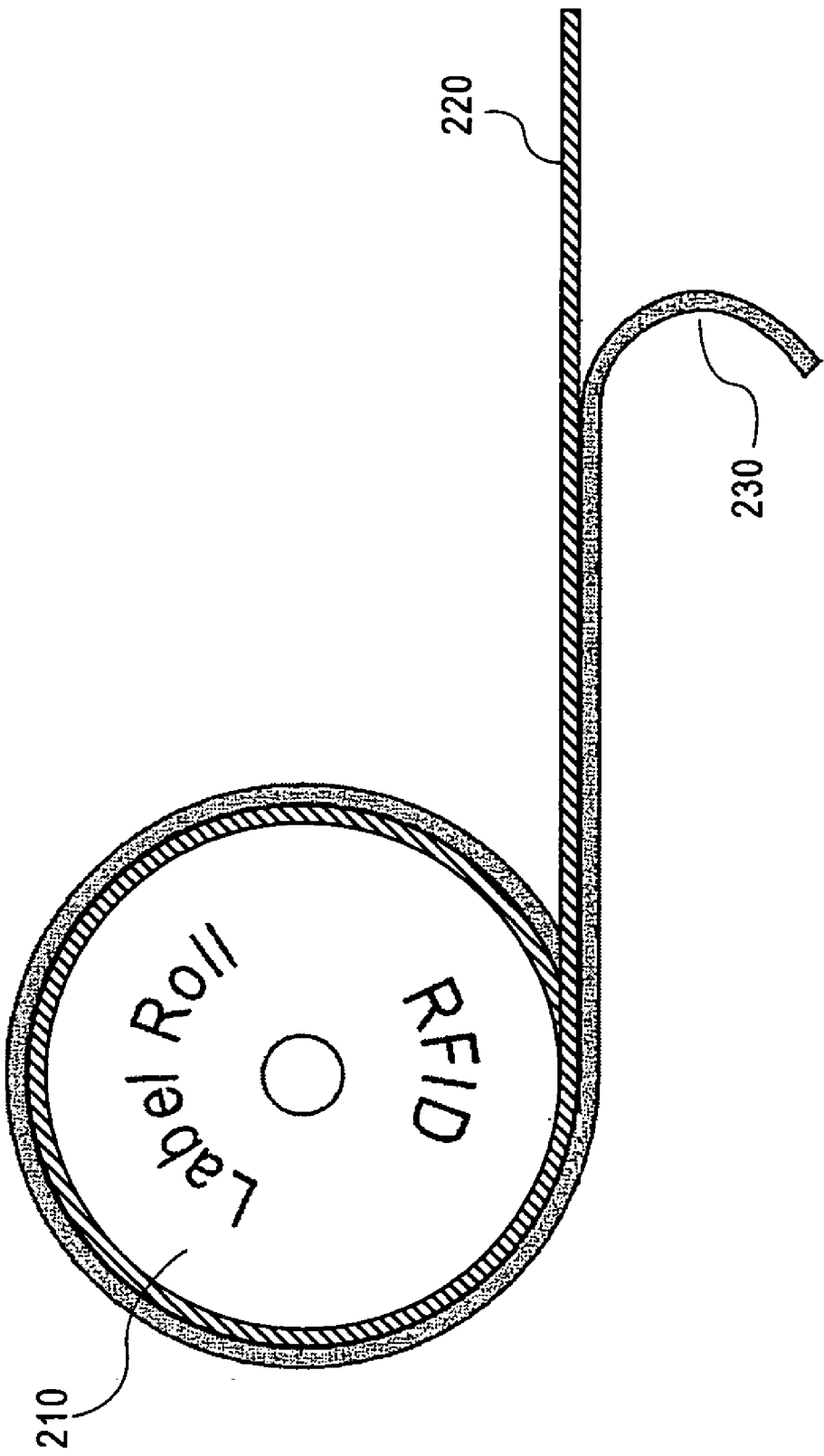
FIG. 2 shows an edge view of a strip of labels with electromagnetic shielding, according to an embodiment of the invention.

FIG. 2 shows an edge view of a strip of labels with electromagnetic shielding, according to an embodiment of the invention. Although the illustrated embodiment shows the strip configured as a roll 210, other embodiments may have other configurations, such as but not limited to sheets or unrolled strips. Strip 220 may represent the labels and any associated material to which the labels are attached (e.g., such as labels 110 and supporting layer 100 of FIG. 1). Electromagnetic shielding 230 may be disposed in the roll so that it shields the RFID antenna elements of the labels in the roll sufficiently to prevent the RFID tags in the roll from receiving enough incoming electromagnetic radiation to power up the RFID tag circuits, and/or to shield any transmissions from powered RFID tag circuits from being transmitted beyond the shielding with sufficient strength to be received by an RFID reader.

The electromagnetic shielding 230 may be comprised of any material suitable for blocking or significantly attenuating electromagnetic signals of a frequency suitable for the RFID tags. Examples may include, but are not limited to, such things as metal foil, a metalized surface on a Mylar or polyester base, a composite of conductive material and non- or semi-conductive material, etc. In some embodiments the effective portion of the electromagnetic shielding 230 (i.e., the portion that actually blocks or attenuates the signals) may cover the entire label area, while in other embodiments the effective portion may only cover a smaller area, such as the area of the antenna elements. In some embodiments the electromagnetic shielding may be simply placed adjacent the labels so that it can be easily removed without force, but other embodiments may use other techniques (e.g., fastening the electromagnetic shielding to the labels and/or supporting layer with a light adhesive that holds the shielding in place but allow the shielding to be removed without excessive force).

Shielding 230 may be separated from strip 220 at some point so that the antenna of a label that has been unrolled will no longer be shielded, while the labels that are still rolled up will remain shielded. In the illustrated embodiment the shielding is outside the associated labels while the labels are still rolled up, so that RFID tag antennas around the outside edge of the roll will remain shielded, but other embodiments may use other configurations.

Figure 3:
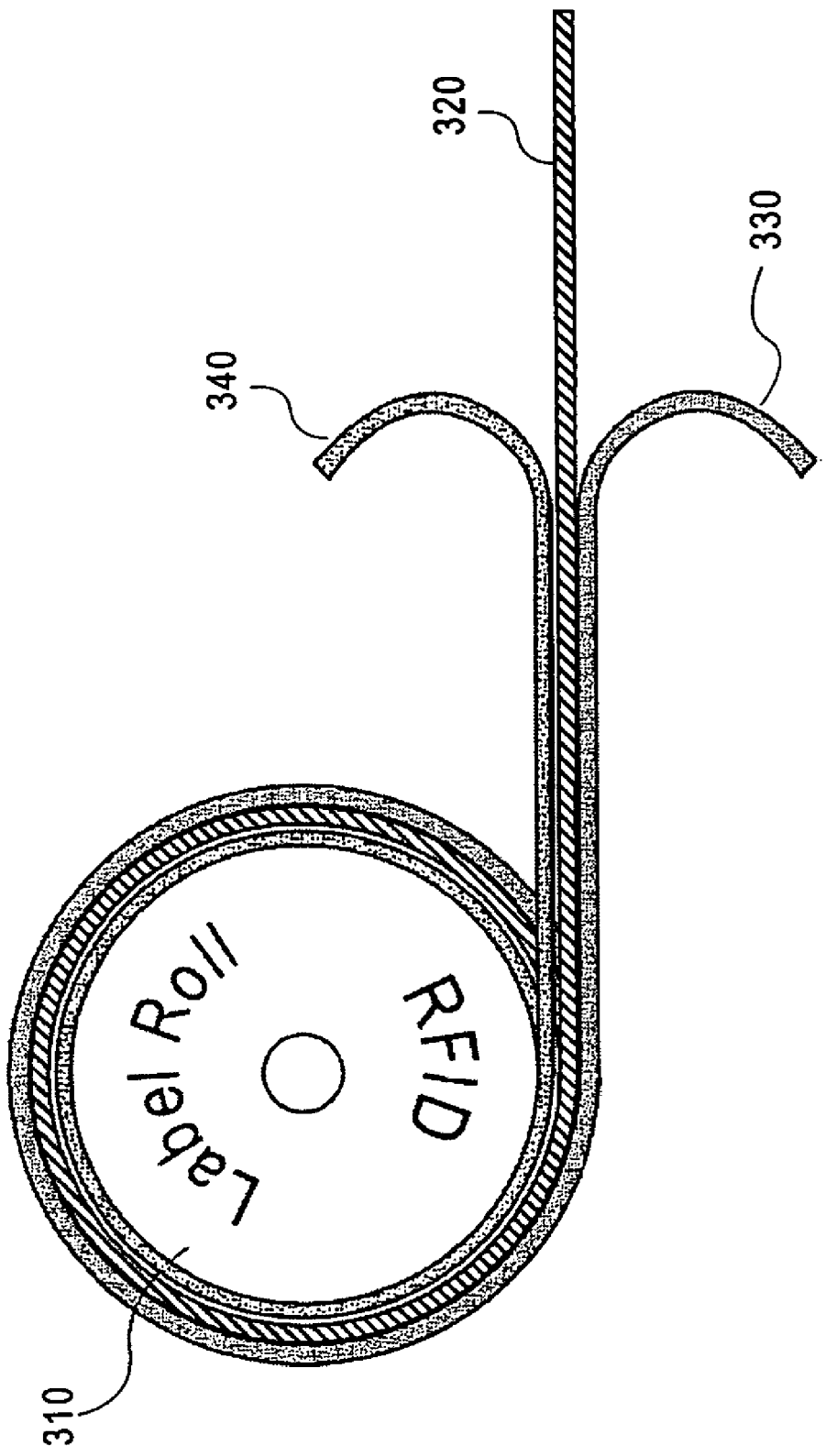
FIG. 3 shows an edge view of a strip of labels with two-sided electromagnetic shielding, according to an embodiment of the invention.

FIG. 3 shows an edge view of a strip of labels with two-sided electromagnetic shielding, according to an embodiment of the invention. The illustrated embodiment of FIG. 3 is similar to the illustrated embodiment of FIG. 2, except the embodiment of FIG. 3 includes layers of shielding on both sides of the labels. In some embodiments the top and bottom layers of shielding 330, 340 may be electrically connected to each other while the labels are rolled up in roll 310. Such a connection may be made in any feasible manner, such as but not limited to: 1) an electrical connection through holes in strip 320, 2) an electrical connection around the edge of strip 320, 3) an electrical connection through a printer or label dispenser that electrically contacts both pieces of shielding 330, 340, 4) etc. In some embodiments the shielding of FIG. 2 and/or FIG. 3 may be electrically grounded, in any feasible manner.

Figure 4:
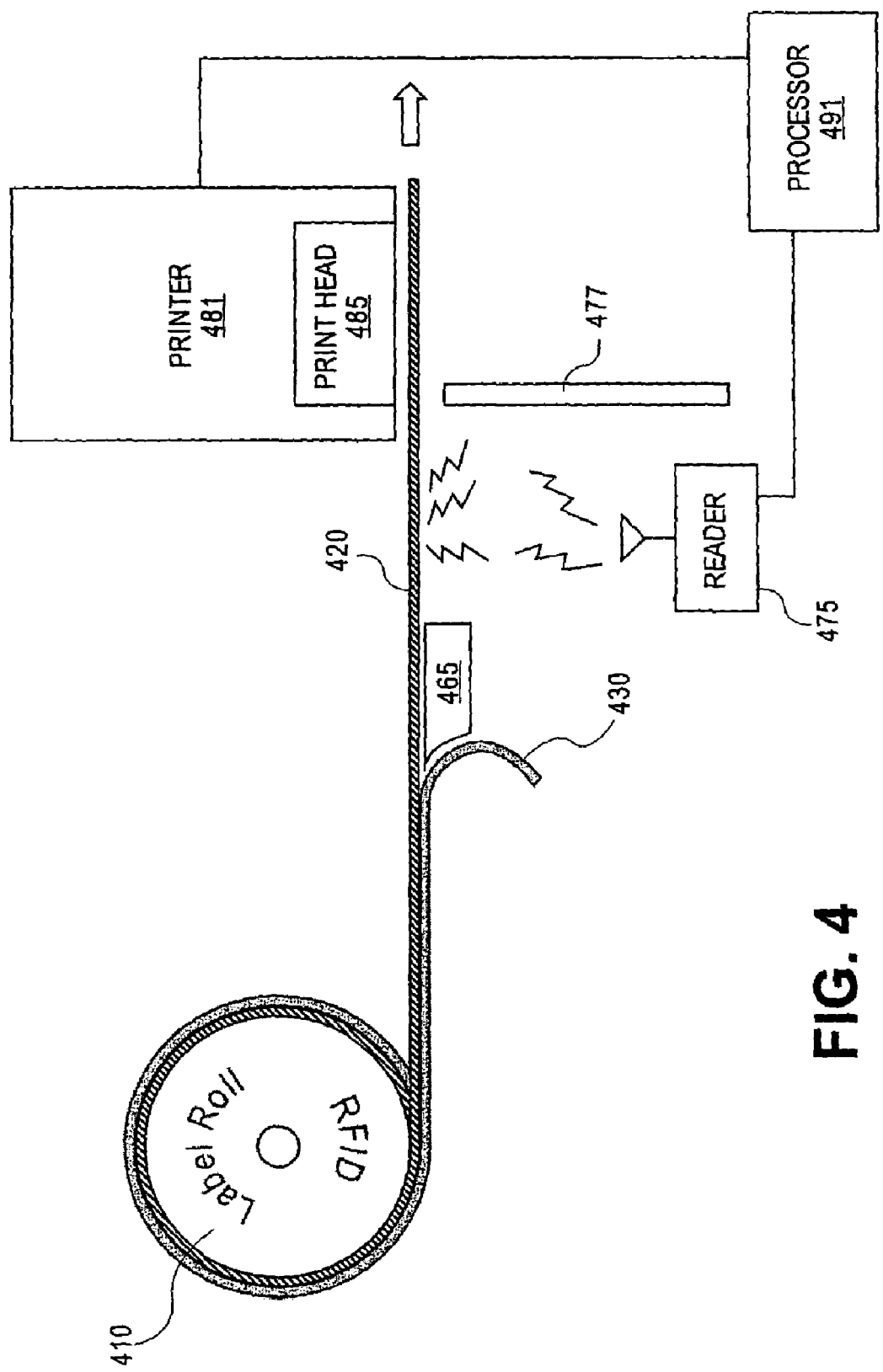
FIG. 4 shows a diagram of a system for reading and printing RFID labels with removable shielding, according to an embodiment of the invention.

FIG. 4 shows a diagram of a system for reading and printing RFID labels with removable shielding, according to an embodiment of the invention. The illustrated embodiment shows the used of single-sided shielding such as that of FIG. 2, but the same principles can easily be extended to double sided shielding such as that of FIG. 3. As a strip 420 of labels is unrolled from roll 410, a separating mechanism 465 may be used to separate shielding 430 from strip 420. The mechanism 465 may be an object with a simple blade-shaped edge such as that shown, or may be any other feasible mechanism or technique. For example, in some embodiments, a take-up roll may pull the shielding 430 away from the strip 420. Once the shielding has been removed from a label, or at least separated enough to uncover the antenna of the RFID tag in the label, the RFID tag in the label may be able to receive signals from an RFID reader 475, and transmit the RFID tag's identification number back to the reader. The print head 485 of a printer 481 may then print associated information on the label, and the strip 420 may then carry the label further, where it may be handled by any useful means. In some embodiments another form of shielding 477 may be used to prevent the label from communicating further with the RFID reader 475 after the label has moved out of the RFID reading area and/or the next label has moved into the RFID reading area, but other embodiments may use other techniques, such as but not limited to ignoring any RFID tag numbers that are received but have already been processed.

A processor 491 may receive the label's RFID tag number from RFID reader 475, and may direct the printer to print the correct information on the associated label. The processor may also create one or more records that associate the label's RFID tag number with the information on the label and/or other information that is associated with the object to which the label will be applied. The record(s) may then be used and/or communicated to other processors in any feasible manner for any feasible purpose.

Although FIG. 4 and the associated text describe a system to perform various operations in a particular sequence (e.g., separate the shielding, then read the tag, then print the label, then create the computer record), some embodiments may perform the operations in a different sequence. For example, if the printed information does not depend on the particular RFID tag number, then the label might be printed before the shielding is removed and the RFID tag read.

Figure 5:
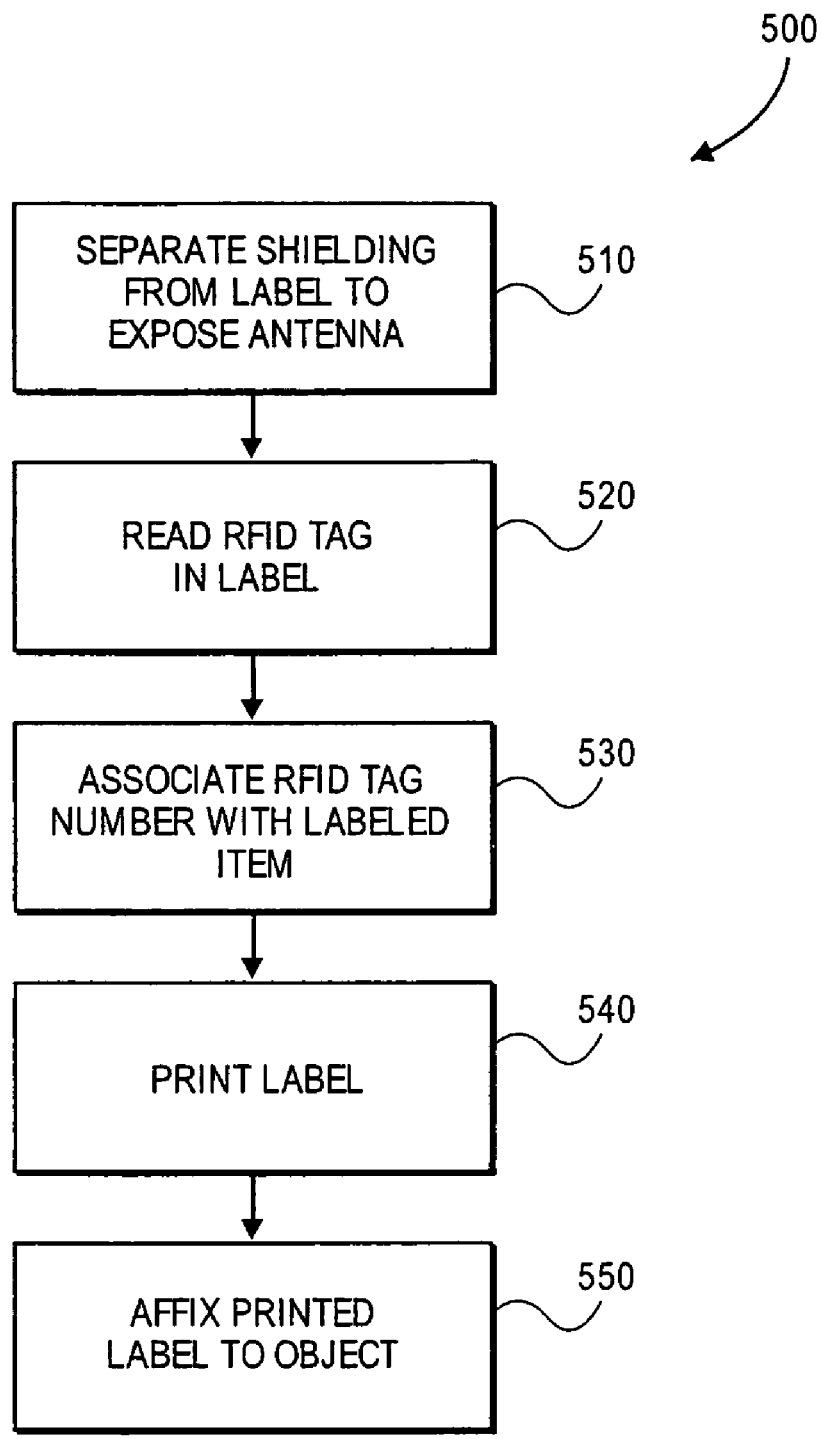
FIG. 5 shows a flow diagram of a method for reading and printing RFID labels with removable shielding, according to an embodiment of the invention.

FIG. 5 shows a flow diagram of a method for reading and printing RFID labels with removable shielding, according to an embodiment of the invention. As described for the system of FIG. 4, various embodiments may perform the illustrated sequence in a different order than described in FIG. 5. In the illustrated flow diagram 500, at 510 the electromagnetic shielding may be separated from a label to expose the RFID antenna in the label. At 520 the RFID tag in the exposed label may be read by an RFID reader. At 530 the RFID tag number may be associated (such as in a computer record) with either the information to be printed on the label, or with an object to which the label is to be attached. At 540 the label may be printed. At 550 the printed label may be affixed to the object with which it is now associated.

Although various embodiments have been described as being associated with a printer, other embodiments may involve pre-printed labels, and the labels may be dispensed, uncovered, read, the appropriate computer records generated, and the labels then handled by a handling mechanism, without any printing. A label feeder mechanism may be used to perform some or all of those operations.

The foregoing description is intended to be illustrative and not limiting. Variations will occur to those of skill in the art. Those variations are intended to be included in the various embodiments of the invention, which are limited only by the spirit and scope of the appended claims.

What is claimed is:

1. An apparatus, comprising:
a label, removably attached to a supporting material, the label suitable for being printed on by a printer, the label comprising a radio frequency identification (RFID) tag; and
removable electromagnetic shielding coupled to the label and disposed so as to shield at least an antenna portion of the RFID tag.

2. The apparatus of claim 1, wherein the removable electromagnetic shielding is disposed on one side of the label.

3. The apparatus of claim 2, wherein the removable electromagnetic shielding is disposed on first and second sides of the label, the second side being opposite the first side.

4. The apparatus of claim 3, wherein a portion of the electromagnetic shielding on the first side of the label is electrically connected to a portion of the electromagnetic shielding on the second side of the label.

5. The apparatus of claim 1, wherein the electromagnetic shielding comprises a flexible conductive planar material.

6. An apparatus, comprising:
a planar material;
a plurality of labels removably attached to the planar material, each label comprising a radio frequency identification (RFID) tag;
electromagnetic shielding removably attached to at least one of the planar material and the plurality of labels, the electromagnetic shielding disposed so as to shield at least an antenna portion of at least one of the RFID tags;
wherein each label is suitable for being printed on by a printer.

7. The apparatus of claim 6, wherein the electromagnetic shielding is disposed on only one side of the planar material.

8. The apparatus of claim 6, wherein the electromagnetic shielding is disposed on both sides of the planar material.

9. The apparatus of claim 6, wherein the electromagnetic shielding comprises a flexible conductive material.

10. The apparatus of claim 6, wherein the electromagnetic shielding is adhesively connected to at least one of the planar material and the plurality of printable labels.

11. The apparatus of claim 6, wherein the electromagnetic shielding is configured to be removable from one of the plurality of labels at a time.

12. The apparatus of claim 6, wherein the planar material is configured in a roll configuration.

13. A system, comprising:
a label feeder mechanism to feed labels to a handling mechanism; and
a shielding removal device to remove electromagnetic shielding from at least one label at a time before said handling;
wherein the labels each contain a radio frequency identification (RFID) tag; and wherein the labels are each suitable for being printed on by a printer.

14. The system of claim 13, wherein the shielding removal device is to remove the electromagnetic shielding from the at least one label sufficiently to permit an RFID reader to read at least one RFID tag embedded in the at least one label.

15. The system of claim 14, further comprising:
an RFID reader to read an RFID tag identification number from a label with the electromagnetic shielding removed; and
a processor to associate device information with the RFID tag identification number.

16. The system of claim 15, further comprising a printer to print the device information on the label with the electromagnetic shielding removed.

17. A method, comprising:
removing electromagnetic shielding from a label comprising a radio frequency identification (RFID) tag;
reading an identification number from the RFID tag; and
printing the RFID tag.

18. The method of claim 17, further comprising associating the identification number with the label in at least one computer record.

19. The method of claim 17, wherein said removing comprises:
physically separating the electromagnetic shielding from the label; and
positioning the label such that an antenna for the RFID tag can receive sufficient electromagnetic radiation from an RFID reader to operate the RFID tag.

* * * * *